(12) United States Patent
Luhman et al.

(10) Patent No.: US 7,366,251 B2
(45) Date of Patent: *Apr. 29, 2008

(54) TRANSMITTER FOR TRANSMITTING A COMBINED CLOCK SIGNAL AND A DIGITAL DATA SIGNAL MODULATED ON A CARRIER WAVE

(75) Inventors: Ricky K. Luhman, LaCrosse, WI (US); Dennis J. Devlin, Wayne, MI (US)

(73) Assignee: The Pulsar Network, Inc., Wayne, MI (US)

( * ) Notice: Subject to any disclaimer, the term of this patent is extended or adjusted under 35 U.S.C. 154(b) by 697 days.

This patent is subject to a terminal disclaimer.

(21) Appl. No.: 10/857,289

(22) Filed: May 28, 2004

(65) Prior Publication Data

US 2004/0223557 A1 Nov. 11, 2004

Related U.S. Application Data

(63) Continuation of application No. 09/916,760, filed on Jul. 27, 2001, now Pat. No. 6,771,712.

(51) Int. Cl.
*H04L 27/00* (2006.01)
(52) U.S. Cl. .................................... 375/295
(58) Field of Classification Search ................. 375/295
See application file for complete search history.

(56) References Cited

U.S. PATENT DOCUMENTS

| | | | | |
|---|---|---|---|---|
| 4,636,747 A | * | 1/1987 | Selim | 331/1 R |
| 4,985,697 A | * | 1/1991 | Boulton | 715/500.1 |
| 5,301,015 A | * | 4/1994 | Kim | 348/493 |
| 5,852,770 A | * | 12/1998 | Kasamatsu | 455/126 |
| 5,966,645 A | * | 10/1999 | Davis | 455/108 |
| 6,285,249 B1 | * | 9/2001 | Bulsara et al. | 327/551 |
| 6,560,297 B1 | * | 5/2003 | Broughton | 375/308 |
| 2002/0031191 A1 | * | 3/2002 | Shimizu | 375/295 |

* cited by examiner

*Primary Examiner*—David C. Payne
*Assistant Examiner*—Leon-Viet Q Nguyen
(74) *Attorney, Agent, or Firm*—John A. Miller; Miller IP Group, PLC

(57) ABSTRACT

A transmitter circuit for transmitting a sine wave modulated with digital data, where the sine wave includes a clock signal, and a receiver circuit for demodulating the transmitted sine wave, where the receiver circuit extracts the clock signal and the digital data from the sine wave. The transmitter circuit includes digital logic components that allow the transmitted sine wave to include at least one bit per cycle of the sine wave, and the receive circuit includes digital logic components that allow the clock signal and the digital data to be extracted from the sine wave. In various embodiments, the transmitted sine wave includes one bit per cycle, one bit per half cycle, multiple bits per cycle and multiple bits per half cycle.

18 Claims, 11 Drawing Sheets

TRANSMITTER FOR TRANSMITTING A COMBINED CLOCK SIGNAL AND A DIGITAL DATA SIGNAL MODULATED ON A CARRIER WAVE

CROSS-REFERENCE TO RELATED APPLICATION

This application is a continuation application of U.S. patent application Ser. No. 09/916,760, filed Jul. 27, 2001, now U.S. Pat. No. 6,771,712 titled System for Extracting a Clock Signal and a Digital Data Signal from a Modulated Carrier Signal in a Receiver.

BACKGROUND OF THE INVENTION

1. Field of the Invention

This invention relates generally to a system and method for modulating a clock signal and digital data onto a sinusoidal carrier wave and, more particularly, to a system and method for modulating a clock signal and a digital data signal onto a sinusoidal carrier wave, where more than one bit of data is transmitted for each cycle of the carrier wave.

2. Discussion of the Related Art

Digital data is transmitted from a transmitter to a receiver in digital communications systems. The digital data is modulated onto a sinusoidal carrier wave in the transmitter, transmitted, and then demodulated or extracted from the carrier wave in the receiver so that the data can be processed. Various modulation and demodulation schemes are known in the art for modulating the carrier wave to distinguish the zero and one bits in the transmitted signal.

Known modulation techniques include amplitude modulation or on/off keying (OOK) where a change in the amplitude of the carrier wave distinguishes a one bit and a zero bit; frequency-shift keying (FSK) where the frequency of the carrier wave is changed to distinguish a one bit and a zero bit; phase-shift keying (PSK) where polarity changes in the carrier wave provides a 180° phase change that is used to distinguish a one bit and a zero bit; and quadrature amplitude modulation (QAM) where the digital data is converted into two-bit symbols which are used to phase modulate the carrier wave. Other types of modulation schemes that combine or are hybrids of those mentioned above are also known in communications systems.

Typically, the transmitter and the receiver employ asynchronous clock signals to control the operation of the various logic circuits. Therefore, the data stream must by synched to the clock signal in the receiver to extract the data. In some systems, a clock signal is transmitted with the data to provide increased clock synchronization capabilities. Further, based on the Nyquist sampling theorem, the sampling rate of the data in the receiver must be at least twice as fast as the data rate. In other words, there must be a minimum of two clock cycles in the receiver for every bit of data. Typically, the data rate is arbitrary relative to the receiver clock signal rate. Thus, there are inherent limitations on how much data can be transmitted at a certain clock rate in the known systems.

Moreover, because the clock signal rate in the receiver is different than the data frequency rate of the transmitted data, there are bandwidth limitations in the system. Particularly, the frequency of the data rate adds sidebands to the center frequency of the carrier wave, which limits the bandwidth in which other carrier waves can be transmitted. Therefore, by not synchronizing the data to the clock, the necessary bandwidth for data transmission is increased. Also, because the carrier waves are typically generated by crystals that have inherent limitations in accuracy, the center frequency of the carrier wave may vary from time to time from an average center frequency.

SUMMARY OF THE INVENTION

In accordance with the teachings of the present invention, a transmitter for modulating a clock signal and a data signal onto a common sinusoidal carrier wave is disclosed, where more than one bit of data is transmitted for each cycle of the carrier wave.

In one embodiment, the transmitter converts the clock signal to a sine wave that is amplified by a comparator device. The data signal to be transmitted is a gain input to the comparator device, so that if the data signal is high, representing a digital one, the sine wave is amplified by the comparator device, and if the data signal is low, representing a digital zero, the sine wave is not amplified by the comparator device. Therefore, the output of the comparator device is an amplitude modulated sine wave that transmits both the clock signal and the data signal where each cycle in the sine wave represents a single bit.

In another embodiment, the transmitter modulates the clock signal with the digital data, so that each half-cycle of the sine wave includes a data bit. In this embodiment, the clock pulse signal is divided by two before being converted to the sine wave.

In another embodiment, the transmitter transmits a sine wave modulated with a digital data stream, where the sine wave includes multiple bits for every cycle of the sine wave. The transmitter includes a divide-by-two counter that receives a square wave clock signal, and divides the clock signal by two. A first inverter inverts the clock signal, and a second inverter inverts the divided clock signal. A square wave-to-sine wave converter receives the inverted and divided clock signal, and converts the square wave clock signal to a sine wave that is modulated with the digital data. An output amplifier receives the sine wave from the converter, which has a gain input that is set by the digital data.

A first logic gate receives the inverted clock signal and the divided clock signal, and outputs a high signal when both the inverted clock signal and the divided clock signal are high. A first flip-flop device receives the output of the first logic gate and the digital data signal, and transfers the data signal to its output when the output of the first logic gate is high. A second logic gate receives the inverted clock signal and the divided clock signal, and outputs a high signal when both the inverted clock signal and the inverted and divided clock signal are high. A second flip-flop device receives the data signal and the output of the second logic gate, and transfers the data signal to its output when the output of the second logic gate is high.

A buffer receives the output of the first flip-flop device and the second flip-flop device, and receives an inverted output of the first logic gate as a clock signal. The buffer simultaneously outputs the outputs of the first flip-flop device and the second flip-flop device each time the inverted output of the first logic gate is high. A summing amplifier, including a voltage divider network, receives both of the outputs of the buffer, where the voltage divider network divides the output of the buffer so that the summing amplifier outputs a first signal level, a second signal level, a third signal level or a fourth signal level depending on the bits being transmitted. The output of the summing amplifier is the gain input to the output amplifier.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to various modulation and demodulation schemes for modulating clock and data signals onto a carrier wave and demodulating the carrier wave are merely exemplary in nature, and are in no way intended to limit the invention or its applications or uses.

Figure 1:
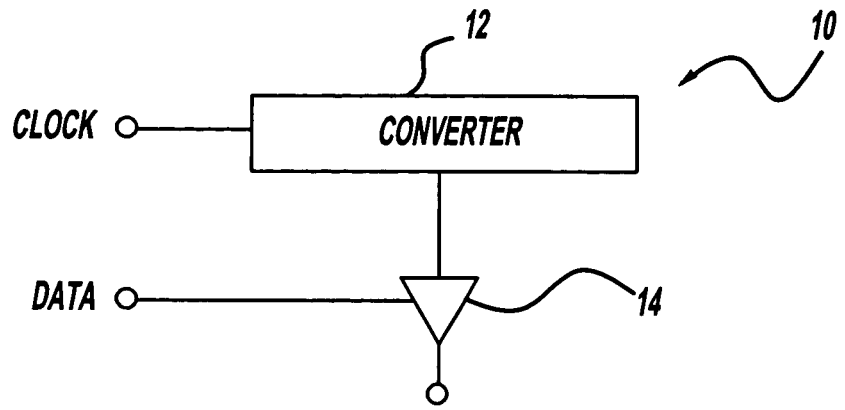
FIG. 1 is a schematic diagram of a modulator circuit in a transmitter, according to the invention, where each cycle of a carrier wave includes a single bit.
Figure 2:
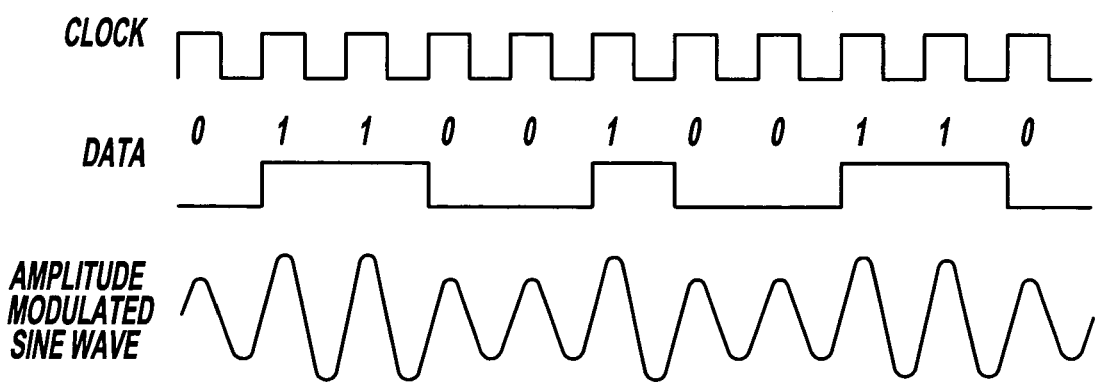
FIG. 2 is a plurality of signal lines showing the clock, data and carrier wave signals for the modulator circuit shown in FIG. 1.

FIG. 1 is schematic diagram of a modulator circuit 10 for use in a transmitter transmitting digital data in a communications system, according to the invention. The modulation circuit 10 modulates a carrier wave with digital data to be transmitted, where each cycle of the carrier wave represents a zero bit or a one bit. In the example being discussed herein, the serial bit data bit stream 01100100110 is being transmitted. FIG. 2 shows a plurality of signal lines, where the pulsed clock signal is shown in the first line and the data signal is shown in the second line, and where the two signals are synchronized relative to each other. The clock signal is synchronized with the data signal being transmitted in any manner known in the art. Many suitable techniques exist for synchronizing clock and data signals, as would be appreciated by those skilled in the art.

The clock signal is applied to a square wave-to-sine wave converter 12 to convert the square-pulse clock signal to the sinusoidal carrier wave. Any suitable device, such as a frequency generator, that converts a square wave clock signal to a corresponding sine wave can be used within the scope of the present invention. The converted sine wave from the frequency generator 12 is an input to an operational amplifier 14, where the amplified sine wave is the carrier wave that is transmitted. The data signal is a gain control input to the amplifier 14, so that when the data signal is low, representing a zero bit, the sine wave from the converter 12 is not amplified, and when the data signal is high, representing a one bit, the sine wave from the generator 12 is amplified. In this example, the un-amplified sine wave has a one volt amplitude at its positive peak, and the amplified sine wave has a two volt amplitude at its positive peak. However, other voltage amplitudes can be used, as would be well appreciated by those skilled in the art. Thus, the output of the amplifier 14 is an amplitude modulated carrier wave shown as a third signal line in FIG. 2. As is apparent, each cycle of the carrier wave represents a bit in the data stream.

Figure 3:
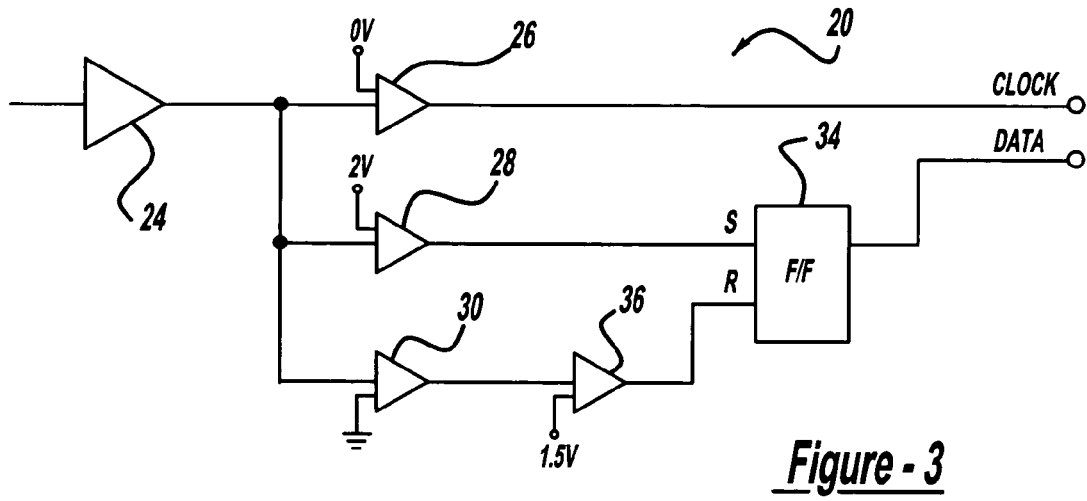
FIG. 3 is a schematic diagram of a demodulator circuit in a receiver, according to the invention, where the demodulator circuit extracts the clock and data signals modulated onto the carrier wave in FIG. 1.
Figure 4:
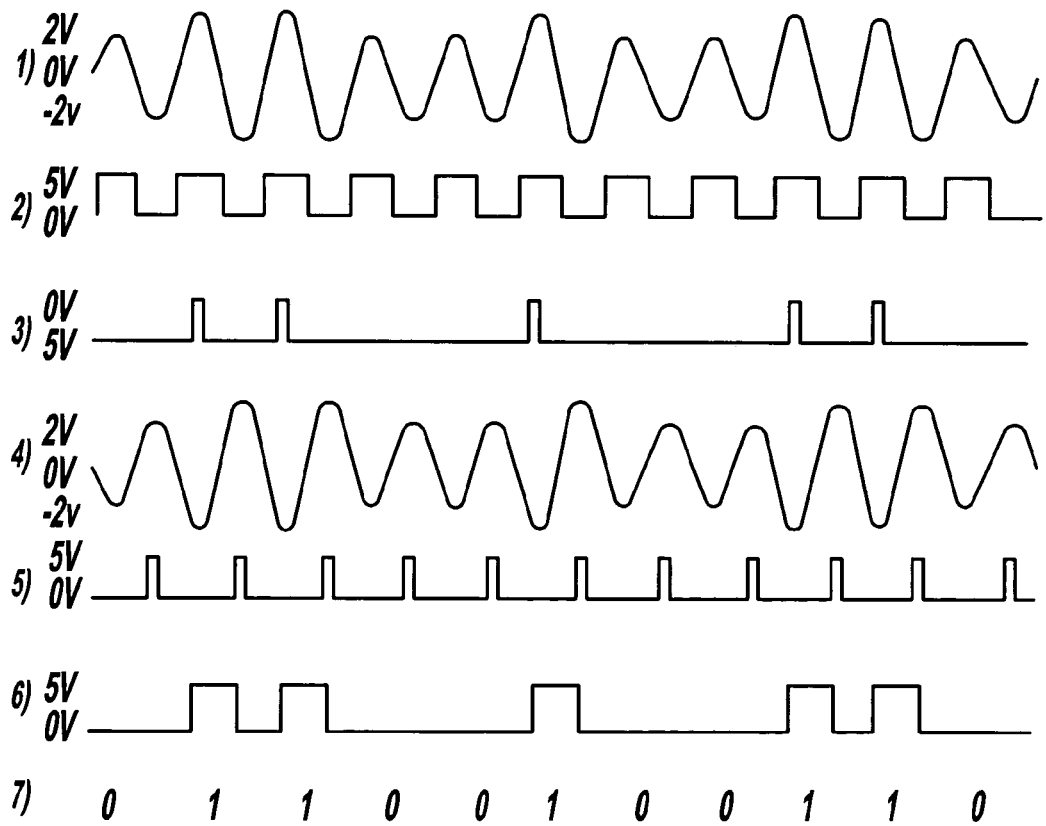
FIG. 4 is a plurality of signal lines for the demodulator circuit shown in FIG. 3.

FIG. 3 is a schematic diagram of a receiver circuit 20 that receives the modulated sine wave transmitted by the transmitter including the modulator circuit 10, and that separates the clock and data signals for communications processing. FIG. 4 shows a series of signal lines for different locations in the receiver circuit 20, as will be discussed below. The signal is received by a receiver front end circuit (not shown), that includes an antenna and other signal conversion circuitry, such as a bandpass filter, as would be well understood to those skilled in the art.

The received signal is then sent to an automatic gain controlled (AGC) amplifier 24 where it is amplified to a stable sine wave for subsequent signal processing. The amplifier 24 can be any amplifier suitable for the purposes described herein. The first signal line of FIG. 4 is the amplified sine wave from the amplifier 24. The amplified signal from the amplifier 24 is then split into three separate paths, where the three split signals are applied to a separate comparator or operational amplifier 26, 28 and 30. The amplifiers 26, 28 and 30 can be any electrical device suitable for the purposes discussed herein. The threshold signals applied to the amplifiers 26, 28 and 30, and to the various amplifiers discussed below, are by way of a non-limiting example. The operational amplifier 26 also receives a threshold signal of zero volts so that each time the sine wave goes positive, the operational amplifier 26 provides an output pulse signal. Thus, the output of the operational amplifier 26 is a square-wave pulse clock signal, as shown in the second signal line of FIG. 4.

The second operational amplifier 28 also receives a two volt threshold signal, which is the value that the amplitude modulated sine wave goes above when the transmitted bit is a one. In other words, if a zero bit is being transmitted, then the amplified sine wave will not go above the two volt threshold, but when a one bit is transmitted, the threshold of the sine wave does go above two volts. The amplifier 28 provides an output for that portion of the modulated sine wave that is above two volts. The third signal line of FIG. 4 shows the output pulses of the amplifier 28. The output of the amplifier 28 is applied to a set input S of an R/S flip-flop 34, which sets the output of the flip-flop 34 high when the flip-flop 34 receives the output pulse from the amplifier 28. The flip-flop 34, as well as the other flip-flops discussed below, can be replaced with other suitable electrical components that operate consistent with the discussion herein as would be appreciated by those skilled in the art.

The amplifier 30 is an inverting amplifier that inverts the sine wave from the amplifier 24, as shown in the fourth signal line of FIG. 4. The inverted sine wave from the amplifier 30 is applied to an input of an operational amplifier 36 along with a threshold signal of 1.5 volts. The amplifier 36 creates an output pulse when the inverted sine wave, or the negative part of the original sine wave, is greater than 1.5 volts, as shown in the fifth signal line in FIG. 4. Thus, the amplifier 36 provides an output pulse for each cycle of the sine wave. This pulse is applied to the reset input R of the flip-flop 34 to make the output of the flip-flop 34 zero for each negative portion of the original sine wave. The flip-flop 34 thus generates the data stream shown in the sixth signal line of FIG. 4. Particularly, each time the output of the amplifier 28 sets the output of the flip-flop 34 high, generating the one bit, the output of the operational amplifier 36 resets the output of the flip-flop 34 low when the original sine wave goes negative, to be ready for the next one bit.

By generating the output of the flip-flop 34 in this manner, the data is read from the output of the flip-flop 34 at the falling edge of the clock signal at a time when the output of the flip-flop 34 is between the rising and falling edge of the one bit, where it is stable. In an alternate embodiment, the clock signal can be inverted, where the data at the output of the flip-flop 34 is read on the rising edge of the clock signal pulses. By using the sine wave to create the square wave timing pulses, the receiver circuit 20 follows the frequency of the incoming sine wave, even if it varies. In other words, variations in the sine wave frequency do not affect the ability of the receiver circuit 20 to extract the data signal therefrom.

Figure 5:
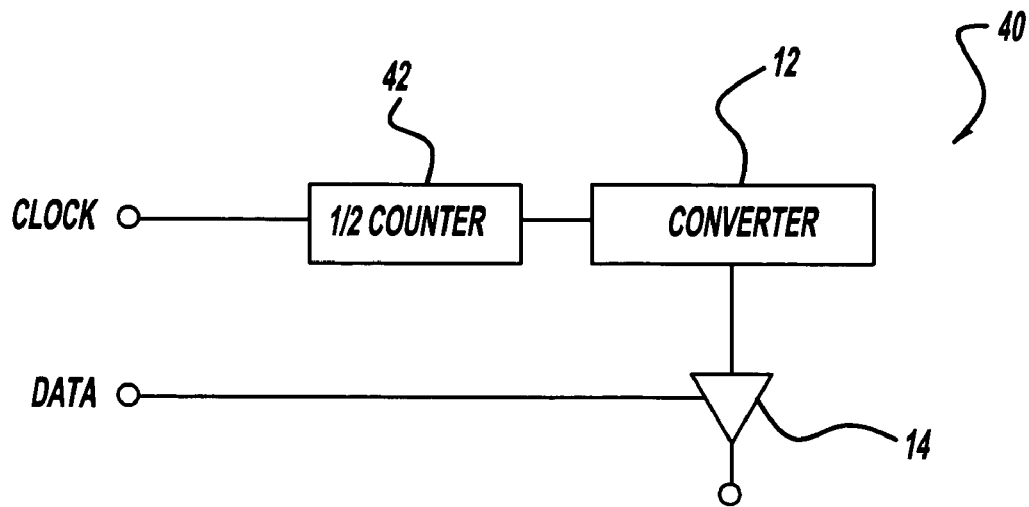
FIG. 5 is a schematic diagram of a modulator circuit for a transmitter, according to the invention, where a digital data bit is provided for each half cycle of the carrier wave.
Figure 6:
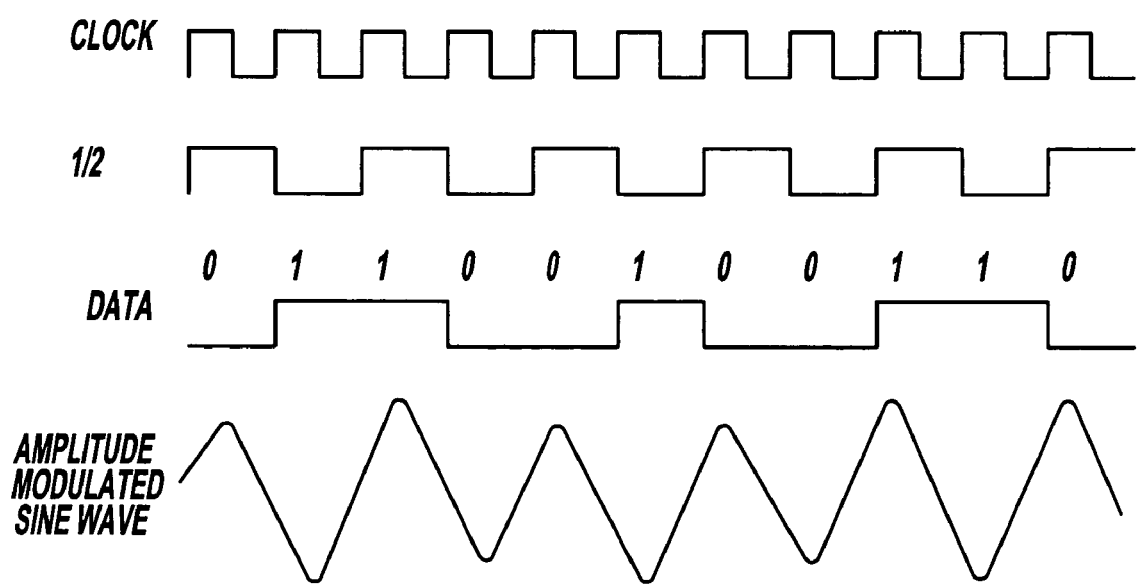
FIG. 6 is a plurality of signal lines for the modulator circuit shown in FIG. 5.

FIG. 5 is a schematic block diagram of another modulator circuit 40, according to the invention, that includes the same converter 12 and amplifier 14 as in the modulator circuit 10 discussed above, operating in the same manner. In this embodiment, a bit is transmitted every half cycle of the carrier wave. To provide this, the clock signal is divided in half by a divide-by-two counter 42 prior to being applied to the converter 12. FIG. 6 shows the same signal lines as in FIG. 2, including the clock output of the divide-by-two counter 42 in the second line.

Figure 7:
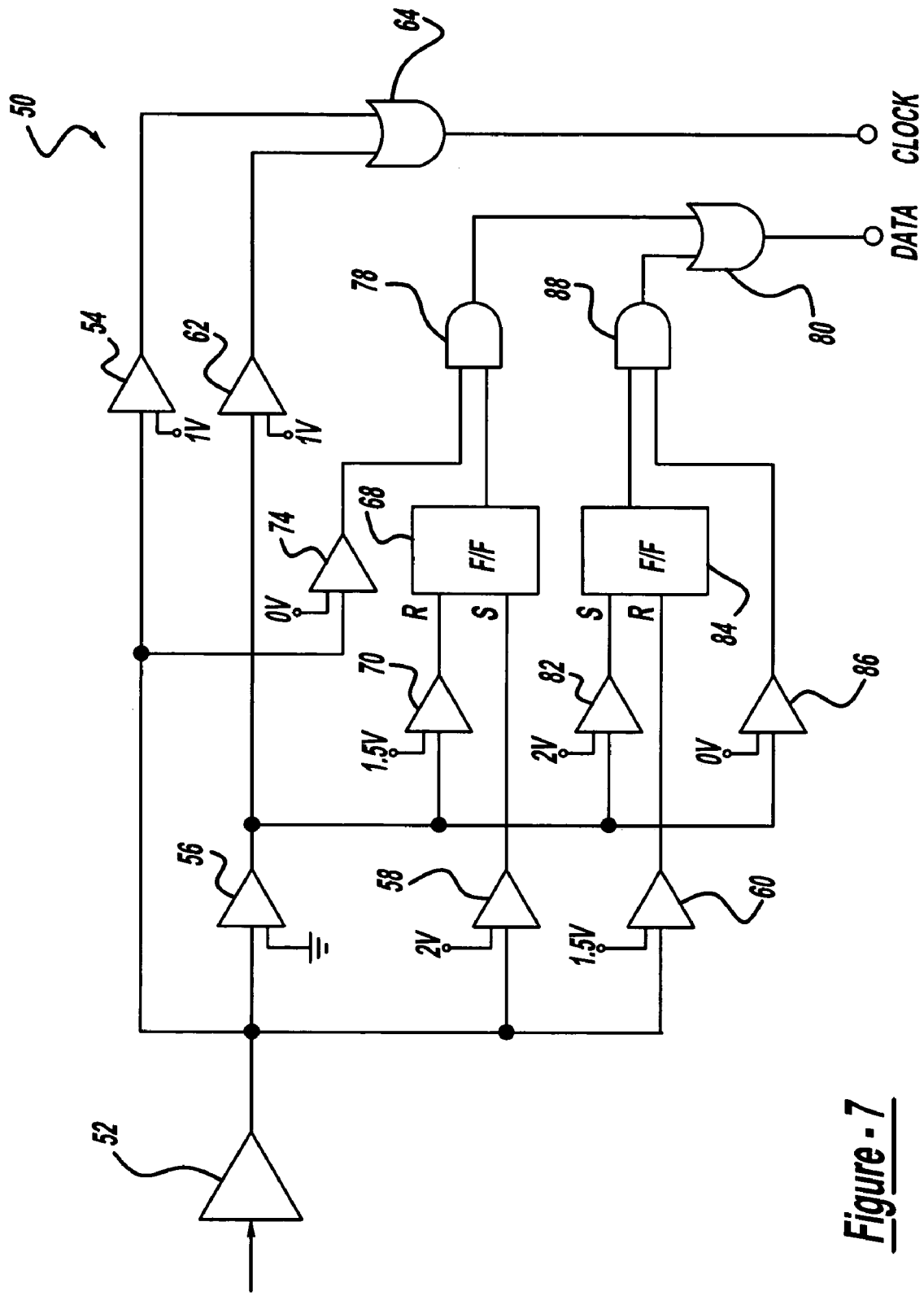
FIG. 7 is a schematic diagram of a demodulator circuit in a receiver, according to the invention, where the demodulator circuit extracts the clock and data signals modulated onto the carrier wave in FIG. 5.
Figure 8:
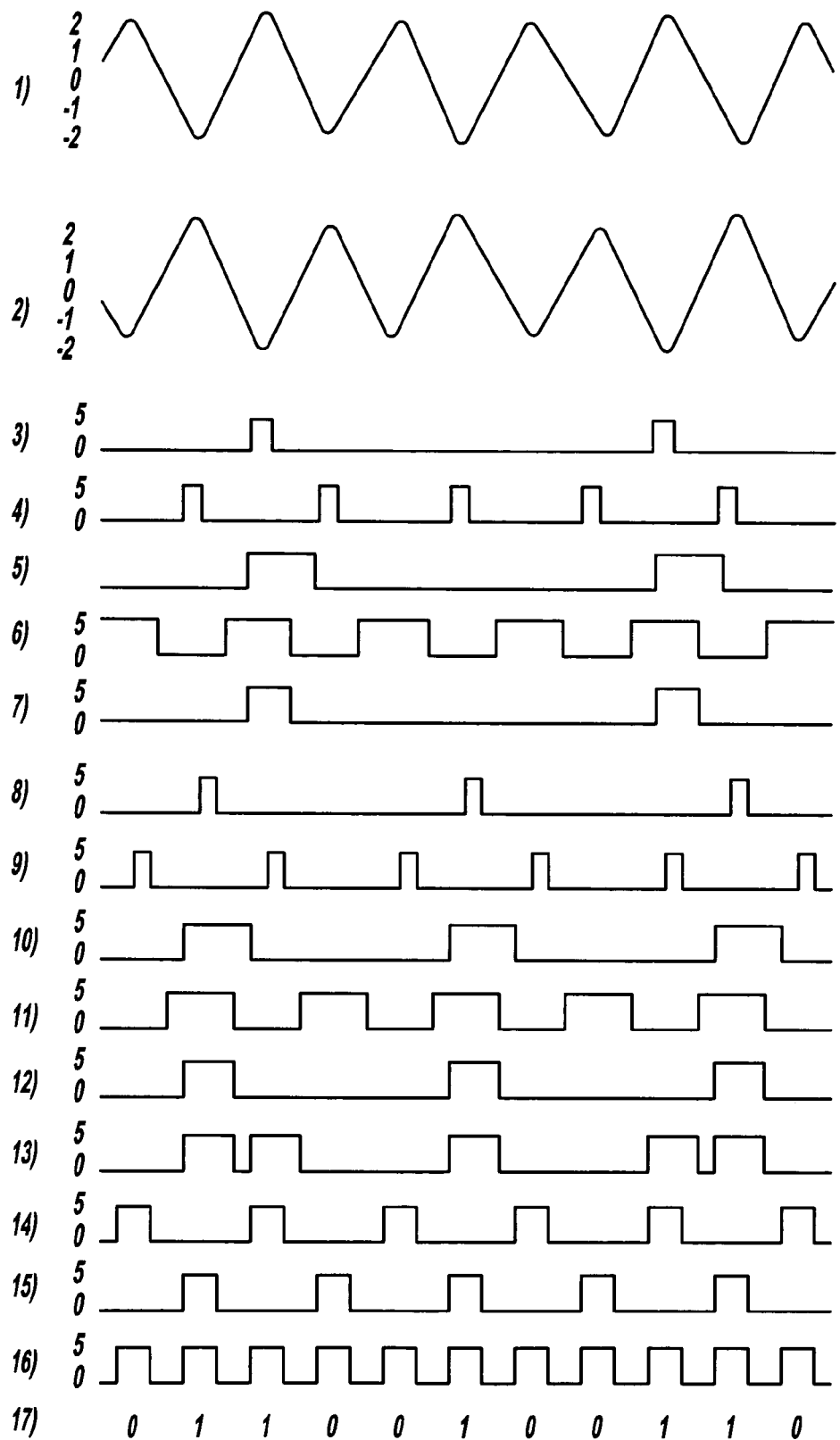
FIG. 8 is a plurality of signal lines for the demodulator circuit shown in FIG. 7.

FIG. 7 is a schematic diagram of a receiver circuit 50 that receives the modulated sine wave transmitted by the transmitter including the modulator circuit 40, and that separates the clock and data signals for communications processing. FIG. 8 shows a series of signal lines for different locations in the receiver circuit 50, as will be discussed below. The received signal is received by a receiver front-end circuit, as discussed above. The received signal is then sent to an AGC amplifier 52 to be amplified to a suitable level for subsequent signal processing. The output of the amplifier 52 is shown in signal line 1 of FIG. 8. The amplified signal is split into four signal paths and applied as one input to operational amplifiers 54, 56, 58 and 60, as shown.

The amplifier 54 also receives a one volt threshold input signal, and provides a pulse output each time the positive portion of the carrier wave goes above one volt, as shown in signal line 14 of FIG. 8. The amplifier 56 is an inverting amplifier that inverts the amplified sine wave, as shown in signal line 2 of FIG. 8. The inverted sine wave from the amplifier 56 is applied to an input of an operational amplifier 62. The other input of the amplifier 62 is a one volt threshold signal so that when the inverted sine wave (negative portion of the original sine wave) goes above one volt, the amplifier 62 provides an output pulse, as shown in line 15 of FIG. 8. Thus, the output of the amplifier 62 is the same signal output as the output of the amplifier 54, but 180° out of phase. The outputs of the amplifiers 54 and 62 are applied to an OR gate 64 that provides a pulsed output signal each time one of the inputs is high. Other logic gates or combinations of logic gates can be used, instead of the OR gate 64, or any of the logic gates discussed below, as would be appreciated by those skilled in the art. Therefore, the output of the OR gate 64 is the recreated clock signal at twice the frequency of the sine wave, as shown in signal line 16 of FIG. 8.

The amplifier 58 also receives a two volt threshold input signal and provides an output pulse each time the amplified sine wave goes above two volts, as shown in signal line 3 of FIG. 8. This pulse signal is applied to the set input S of an R/S flip-flop 68. The output of the inverting amplifier 56 is applied as an input to an operational amplifier 70 along with a 1.5 volt threshold input signal. Therefore, the output of the amplifier 70 is high when the negative portion of the original sine wave goes above 1.5 volts, or for every peak of the inverted sine wave, as shown in signal line 4 of FIG. 8. The output from the amplifier 70 is applied to the reset input R of the flip-flop 68. Thus, each time a one bit is transmitted on the positive portion of the carrier wave, the amplifier 58 will provide an output pulse and the output of the flip-flop 68 will go high, as shown in signal line 5 of FIG. 8. Then, for each negative peak of the sine wave, the flip-flop 68 is reset for the next one bit.

The amplified sine wave from the amplifier 52 is also provided as an input to an operational amplifier 74 along with a zero volt threshold input. Therefore, the output of the amplifier 74 is high for each positive portion of the original sine wave, as shown in line 6 of FIG. 8. The output of the amplifier 74 and the output of the flip-flop 68 are applied to an AND gate 78 that provides an output signal to an OR gate 80 each time both of its inputs are high, as shown in signal line 7 of FIG. 8. Thus, if a one bit is transmitted on the positive portion of the sine wave, the output of the AND gate 78 is high, providing a high data output at the output of the OR gate 80.

For the data bit on the negative portion of the original sine wave, the inverted sine wave from the amplifier 56 and a two-volt threshold signal are applied as inputs to an amplifier 82. Thus, when the negative portion of the original sine wave is transmitting a one bit, the output of the amplifier 82 goes high, as shown in signal line 8 of FIG. 8, which is applied to the set input S of an R/S flip-flop 84. Each positive portion of the sine wave resets the flip-flop 84. Particularly, the sine wave from the amplifier 52 and a 1.5 volt threshold signal are provided as inputs to the amplifier 60, which provides an output pulse at the peaks of the positive portion of the sine wave, shown in signal line 9 of FIG. 8, that are applied to the reset input R of the flip-flop 84. Thus, when a one bit on the negative portion of the sine wave sets the output of the flip-flop 84 high, the positive portion of the sine wave resets the flip-flop 84 to low in anticipation of the next one bit on the negative portion of the original sine wave, as shown in signal line 10 of FIG. 8.

The inverted sine wave from the amplifier 56 is applied to an amplifier 86 along with a zero volt threshold input signal so that the output of the amplifier 86 is positive for each negative portion of the original sine wave, as shown in signal line 11 of FIG. 8. The output of the amplifier 86 and the output of the flip-flop 84 are applied to the inputs of an AND gate 88. Thus, every time a one bit is transmitted on the negative portion of the original sine wave, the output of the AND gate 88 is high, as shown in signal line 12 of FIG. 8, which is applied to the OR gate 80. Thus, the output of the OR gate 80 is high, indicating a one bit whenever a one bit is transmitted on the positive portion or the negative portion of the original sine wave, as shown in signal line 13 of FIG. 8. The data is read on the falling edge of the clock signal, and is shown in line 17 of FIG. 8.

Figure 9:
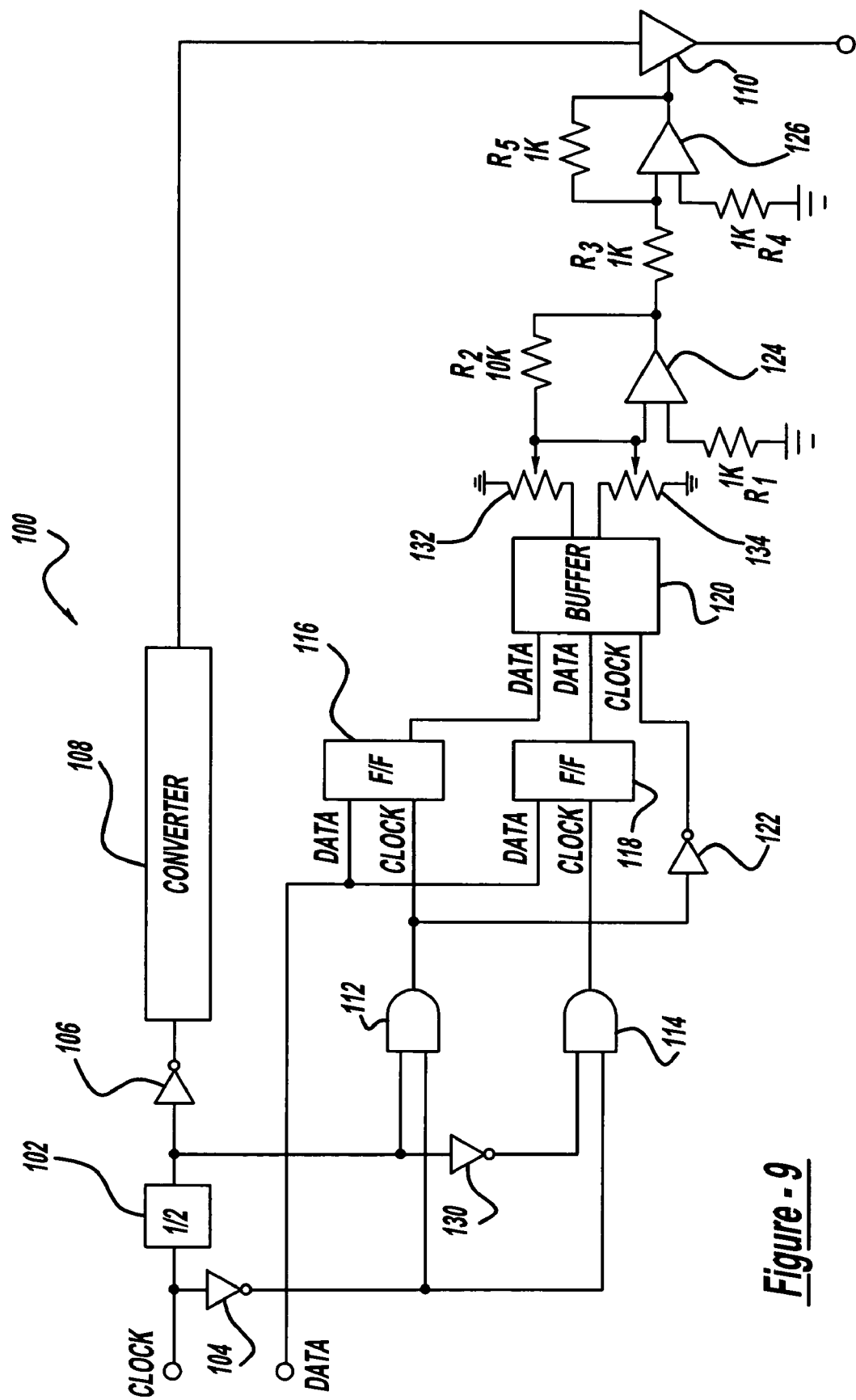
FIG. 9 is a schematic diagram of a modulator circuit for a transmitter, according to the invention, where a clock signal is converted to a carrier wave that is modulated by a digital data signal, where there are multiple digital data bits for each cycle of the carrier wave.
Figure 10:
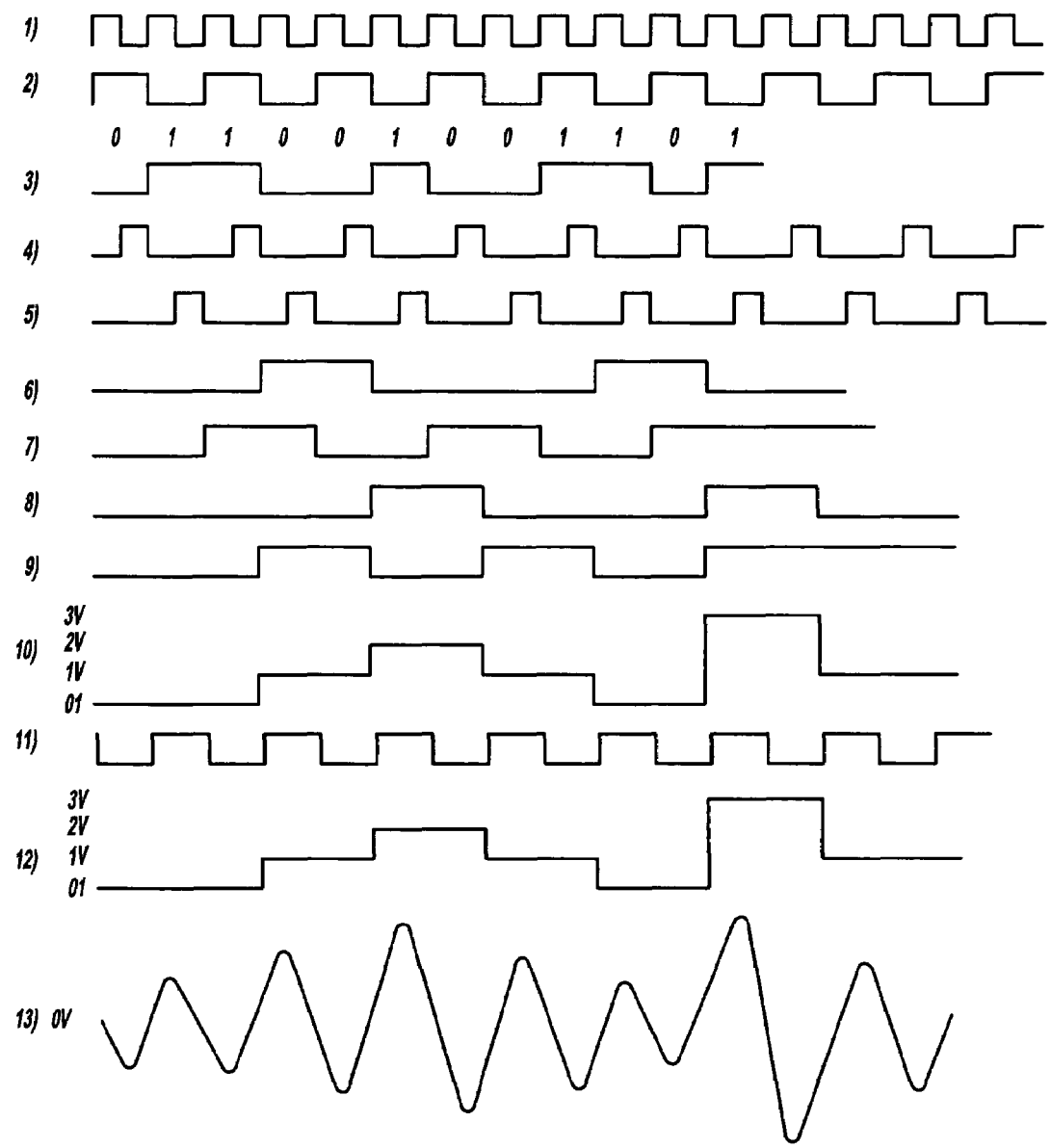
FIG. 10 is a plurality of signal lines for the modulator circuit shown in FIG. 9.

FIG. 9 is a schematic diagram of a modulator circuit 100 for a transmitter that transmits a carrier wave including multiple bits on the combination of the positive portion and the negative portion of each cycle of the sine wave. The same data stream of digital data bits 011001001101 is being transmitted, as discussed above. FIG. 10 shows various signal lines for different locations in the modulator circuit 100, as will be discussed below. In this embodiment, the modulator circuit 100 has two bits of resolution, represented as digital words 00, 01, 10 or 11, for transmitting the numbers 0, 1, 2 or 3, respectively. Different levels of amplitude modulation are provided for each of the digital words being transmitted, where the digital word 00 has no amplification. As will be appreciated by those skilled in the art, variations of the digital words being transmitted, different bit resolutions and different levels of signal amplification can be employed within the scope of the present invention.

The clock pulse signal, shown in signal line 1 of FIG. 10, is applied to a divide-by-two counter 102 and an inverter 104. The divided clock signal, shown in signal line 2 of FIG. 10, from the counter 102 is also applied to an inverter 106. The clock signal that has been divided by two and inverted, is then applied to a square wave-to-sine wave converter 108, as above, that converts the square pulse clock signal to a sine wave to be the carrier wave that is transmitted. The sine wave from the converter 108 is applied to an amplifier 110, whose gain is set by one of the digital words 00, 01, 10 or 11, as will be discussed in more detail below.

The inverted original clock pulse signal from the inverter 104 is applied to one input of two AND gates 112 and 114. The divided clock pulse signal from the divider 102 is applied to the other input of the AND gate 112 and to an inverter 130. The inverted and divided clock pulse signal from the inverter 130 is applied to the other input of the AND gate 114. When the negative portion of the original clock signal and the positive portion of the divided clock signal are both high, the output of the AND gate 112 is high, as shown in signal line 4 of FIG. 10. Likewise, when the negative portion of the original clock signal and the negative portion of the divided clock signal are both high, the output of the AND gate 114 is high, as shown in signal line 5 of FIG. 10. Therefore, the combination of the outputs of the AND gates 112 and 114 provide alternating square-wave clock pulses that are used for timing purposes.

The output of the AND gate 112 is a clock input to a flip-flop 116 and the output of the AND gate 114 is a clock input to a flip-flop 118. The data stream being transmitted, shown in line 3 of FIG. 10, is applied to the data inputs of the flip-flops 116 and 118. The flip-flops 116 and 118 read the data on the rising edge of the clock pulses from the AND gates 112 and 114, respectively, and then transfer the data to their outputs at the falling edge of the clock pulses to the flip-flops 116 and 118. Therefore, the flip-flop 116 provides output pulses of the last data bit at the falling edge of the clock signal from the AND gate 112, as shown in signal line 6 of FIG. 10. Likewise, the flip-flip 118 provides output pulses of the last data bit at the falling edge of the clock signal from the AND gate 114, as shown in signal line 7 of FIG. 10.

The output of the flip-flop 116 is applied to one data input of a buffer 120 and the output of the flip-flop 118 is applied to another data input of the buffer 120. In one example, the buffer 120 is a first-in first-out (FIFO) buffer, but other buffers can also be used. The output of the AND gate 112 is applied to an inverter 122, and the inverted output of the AND gate 112 is applied to a clock input of the buffer 120. Each time a clock pulse is received at the buffer 120, both of the data signals at the output of the flip-flops 116 and 118 are simultaneously passed through the buffer 120, as shown in signal lines 8 and 9, respectively, of FIG. 10. The output of the buffer 120 is applied to one input of a summing amplifier 124 through variable resistors 132 and 134. The resistor 132 is set to provide a one volt potential and the resistor 134 is set to provide a two volt potential. The other input of the amplifier 124 is tied to ground through resistor $R_1$.

For those clock pulses that neither of the data inputs to the buffer 120 are high (00), the amplifier 124 does not provide an output signal. For those clock pulses that the output of the flip-flop 116 is high and the output of the flip-flop 118 is low (01), the signal applied to the input of the amplifier 124 through the buffer 120 is set by the resistor 132 to provide a first level of amplification. For those clock pulses that the output of the flip-flop 116 is low and the output of the flip-flop 118 is high (10), the signal applied to the input of the amplifier 124 through the buffer 120 is set by the resistor 134 to provide a second level of amplification. For those clock pulses where the output of the flip-flop 116 and the flip-flop 118 are both high (11), the signal applied to the input of the amplifier 124 through the buffer 120 is set by both of the resistors 132 and 134 to provide a third level of amplification. In the example provided herein, the amplifier 124 outputs zero volts for (00); one volt for (01); two volts for (10) and three volts for (11). However, this is by way of a non-limiting example, in that other voltage levels can be used to distinguish the two-bit digital words. The output of the amplifier 124 is shown in signal line 10. Further, as would be appreciated by those skilled in the art, the circuit 100 could be expanded to transmit more bits per cycle for a higher resolution.

Because the amplifier 124 is an inverting amplifier, the output of the amplifier 124 is applied to another inverting amplifier 126 that inverts the signal from the amplifier 124, as shown in signal line 12 of FIG. 10. The output of the amplifier 126 is the gain input to the amplifier 110, so that the sine wave from the converter 108 is either not amplified, or amplified to one of a first, second or third level, as shown in signal line 13 of FIG. 10.

Figure 11:
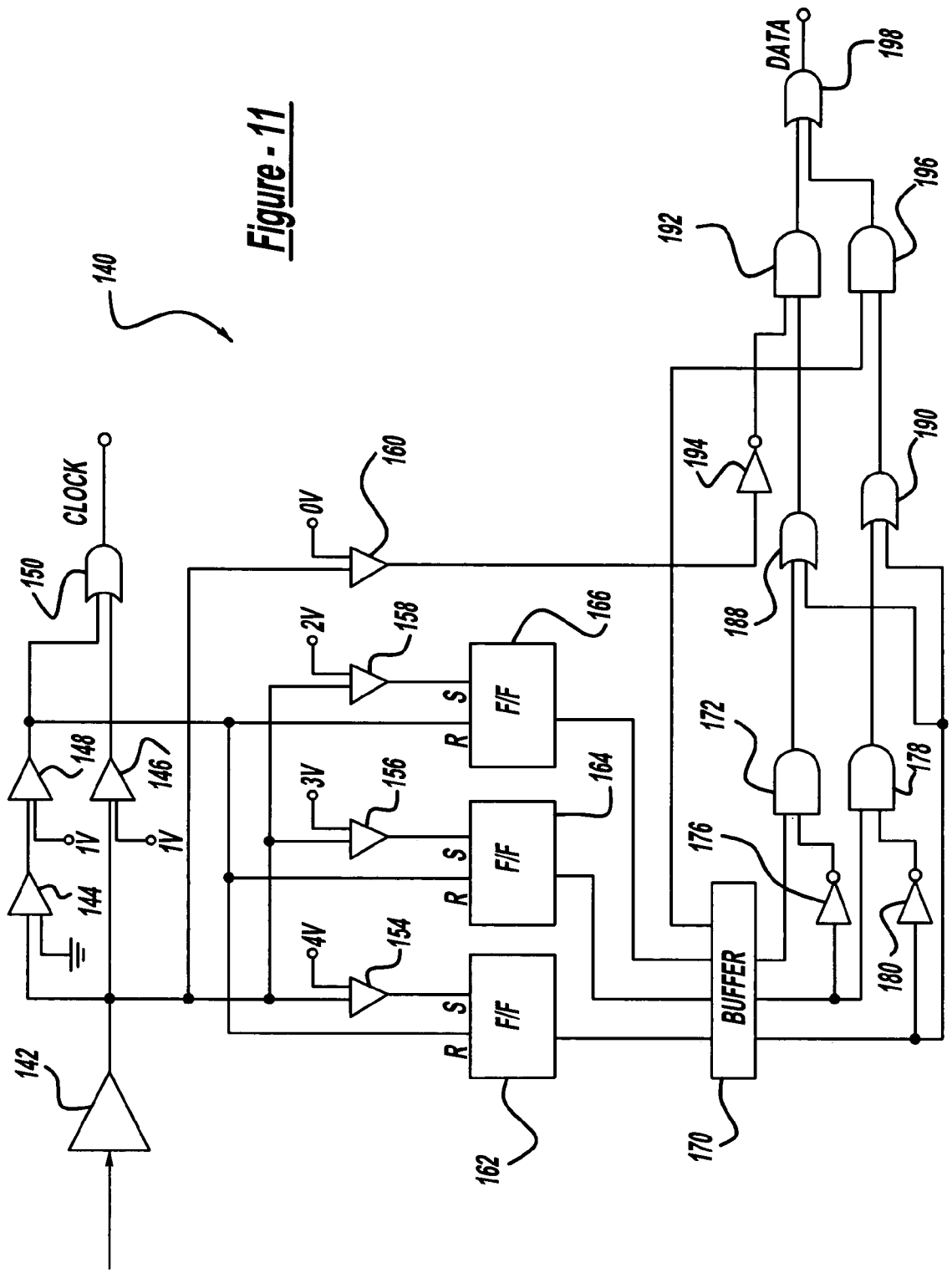
FIG. 11 is a schematic diagram of a demodulator circuit in a receiver, according to the invention, where the demodulator circuit extracts the clock and data signals modulated onto the carrier wave in FIG. 9.

FIG. 11 is a schematic diagram of a receiver circuit 140, according to another embodiment of the present invention, that extracts the clock and data signals modulated onto the sine wave transmitted by the modulator circuit 100 in FIG. 9. The received signal is then sent to an AGC amplifier 142 to be amplified to a suitable level for subsequent signal processing. The amplified signal from the amplifier 142 is applied to an inverting amplifier 144 and one input of an operational amplifier 146. A one volt signal is applied to the other input of the amplifier 146. Thus, for each positive portion of the sine wave, the amplifier 146 provides an output pulse. The inverted signal from the amplifier 144 is applied to one input of an operational amplifier 148, and a one volt signal is applied to the other input of the amplifier

148. Thus, for each negative portion of the sine wave, the amplifier 148 provides an output pulse. The outputs of the amplifiers 146 and 148 are applied to an OR gate 150 that provides an output pulse for each positive and negative portion of the carrier wave, and thus recreates the original clock signal before it was divided by the counter 102.

The signal from the amplifier 142 is also applied to one input of four operational amplifiers 154, 156, 158 and 160. A four volt signal is applied to the other input of the amplifier 154, a three volt signal is applied to the other input of the amplifier 156, a two volt signal is applied to the other input of the amplifier 158, and a zero volt signal is applied to the other input of the amplifier 160. Therefore, whenever the amplified sine wave goes positive, the amplifier 160 provides an output pulse, and every time the sine wave goes above two volts, the amplifier 158 provides an output pulse, and every time the sine wave goes above three volts, the amplifier 156 provides an output pulse, and every time the sine wave goes above four volts, the amplifier 154 provides an output pulse. Thus, when a 00 bit word is transmitted, none of the amplifiers go high, when a 01 bit word is transmitted, the amplifier 158 goes high, when a 10 bit word is transmitted, both the amplifiers 156 and 158 go high, and when a 11 bit word is transmitted, all of the amplifiers 154, 156 and 158 go high.

The output of the amplifier 154 is applied to the set (S) input of a flip-flop 162 and the output of the amplifier 148 is applied to the reset input (R) of the flip-flop 162. The output of the amplifier 156 is applied to the set (S) input of a flip-flop 164 and the output of the amplifier 148 is applied to the reset input (R) of the flip-flop 164. The output of the amplifier 158 is applied to the set (S) input of a flip-flop 166 and the output of the amplifier 148 is applied to the reset input (R) of the flip-flop 166. Thus, when a 11 bit word is transmitted, the output of the flip-flop 162 is set high, and then is reset to zero when the negative portion of the sine wave goes above one volt. Likewise, when a 10 bit word is transmitted, the output of the flip-flop 164 goes high, and then is reset to zero when the negative portion of the sine wave goes above one volt. Also, the output of the flip-flop 166 goes high when a 01 bit word is transmitted, and the flip-flop 166 is reset when the negative portion of the sine wave goes above one volt. In this configuration, all of the outputs of the flip-flops 162, 164 and 166 are high when a 11 bit word is transmitted, the output of the flip-flops 164 and 166 are high when a 10 bit word is transmitted, but the output of the flip-flop 162 is low, and the output of the flip-flop 166 is high and the outputs of the flip-flops 162 and 164 are low when a 01 bit word is transmitted.

The outputs from the flip-flops 162,164 and 166 are applied as data inputs to a FIFO buffer 170, and the output of the amplifier 160 is applied as a clock signal to the buffer 170. Each time the clock signal from the amplifier 160 goes high, the signals at the outputs of the flip-flops 162-166 are simultaneously transferred to the output of the buffer 170.

The output of the flip-flop 166 is transferred through the buffer 170 to one input of an AND gate 172. The output of the flip-flop 164 is transferred through the buffer 170 and through an inverter 176 to the other input of the AND gate 172, and through the buffer 170 to one input of an AND gate 178. The output of the flip-flop 162 is transferred through the buffer 170 and through an inverter 180 to the other input of the AND gate 178.

When the 01 bit word is transmitted, both inputs to the AND gate 172 are high, and thus the output of the AND gate 172 is high. When the 10 bit word is transmitted, the inverted input to the AND gate 172 is low, so the output of the AND gate 172 is low, but both inputs to the AND gate 178 are high, so the output of the AND gate 178 is high. When the 11 bit word is transmitted, both of the inverted inputs to the AND gates 172 and 178 are low, and thus the outputs of the AND gates 172 and 178 are low. The output of the flip-flop 162 is transferred through the buffer 170 to one of the inputs of a pair of OR gates 188 and 190. The other input of the OR gate 188 is the output of the AND gate 172, and the other input of the OR gate 190 is the output of the AND gate 178, as shown.

Therefore, when the outputs of the OR gates 188 and 190 are low, a 00 bit word is being transmitted. When the output of the OR gate 188 is high, and the output of the OR gate 190 is low, a 01 bit word is being transmitted. When the output of the OR gate 188 is low and the output of the OR gate 190 is high, a 10 bit word is being transmitted. When both of the outputs of the OR gates 188 and 190 are high, a 11 bit word is being transmitted.

The output of the amplifier 160 is applied through an inverter 194 to one input of an AND gate 192, and the output of the OR gate 188 is applied to the other input of the AND gate 192. The output of the amplifier 160 is also applied to one input of an AND gate 196, and the output of the OR gate 190 is applied to the other input of the AND gate 196. The output of the AND gates 192 and 196 are applied as inputs to an OR gate 198, which is the data output.

When a 1 bit is being transmitted on a negative portion of the sine wave, the output of the AND gate 192 is high. Further, when a 1 bit is being transmitted on the positive portion of the sine wave, the output of the AND gate 196 is high. When either of the outputs of the AND gates 192 or 196 is high, the output of the OR gate 198 is high. Thus, when the 00 bit word is being transmitted, the outputs of the AND gates 192 and 196 are low, and the output of the OR gate 198 is low. When the 01 bit word is being transmitted, the output of the AND gate 192 is high and the output of the AND gate 196 is low, and the output of the OR gate 198 is high. The positive portion of the cycle transmits the least significant bit (LSB). When the 10 bit word is being transmitted, the output of the AND gate 192 is low and the output of the AND gate 196 is high, and the output of the OR gate 198 is high. When the 11 bit word is being transmitted, both of the outputs of the AND gates 192 and 196 are high, and the output of the OR gate 198 is high.

Figure 12:
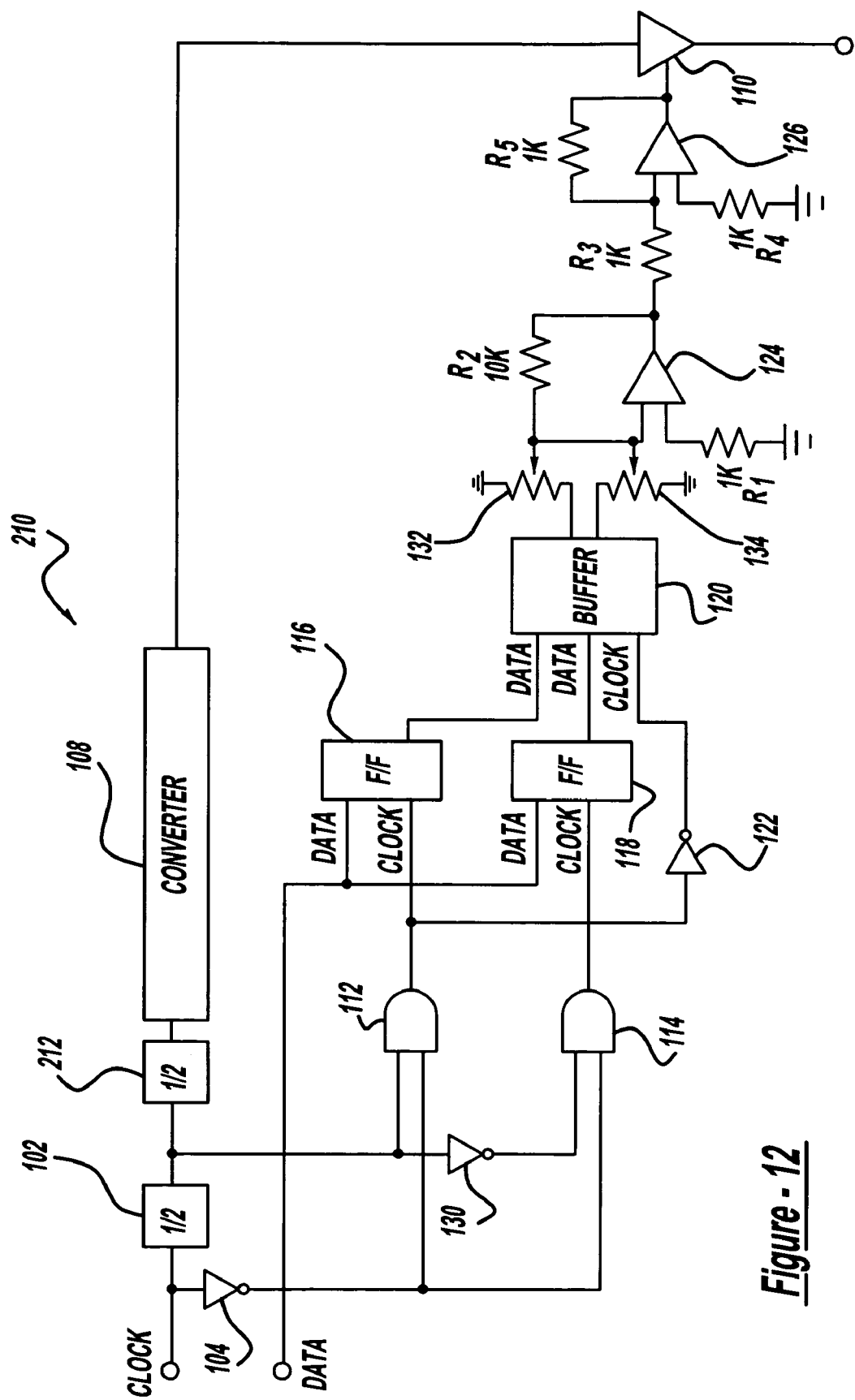
FIG. 12 is a schematic diagram of a modulator circuit for a transmitter, according to the invention, where a clock signal is converted to a carrier wave that is modulated by a digital data signal, and where there are multiple digital data bits for each half cycle of the carrier wave.
Figure 13:
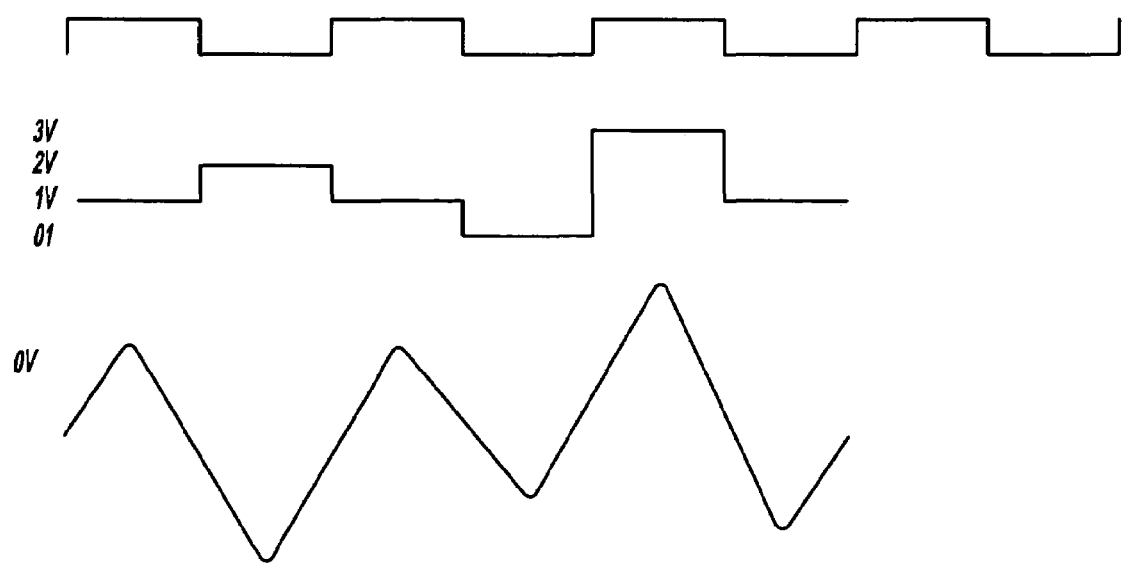
FIG. 13 is a plurality of signal lines for the modulator circuit shown in FIG. 12.

FIG. 12 is a schematic diagram of a modulator circuit 210 for a transmitter that transmits a sine wave including multiple bits for both the positive portion and the negative portion of each cycle of the sine wave. The modulator circuit 210 is nearly identical to the modulator circuit 100 discussed above, where like components are identified with the same reference numeral, except that the modulator circuit 210 employs a second divide-by-two counter 212 that further divides the clock input signal in half. Therefore, the output of the amplifier 110 is one-half the frequency as the amplifier 110 in the modulator circuit 100. This allows two bits to be transmitted for each half-cycle. FIG. 13 shows a few of the signal lines for the circuit 210 not shown in FIG. 10. In this embodiment, the modulator circuit 210 includes two bits of resolution per each half cycle of the carrier wave, represented as digital words 00, 01, 10 or 11, instead of two bits of resolution for each full cycle as in the modulator circuit 100. In other embodiments, the clock signal can be divided further to transmit more bits per cycle or half-cycle.

Figure 14:
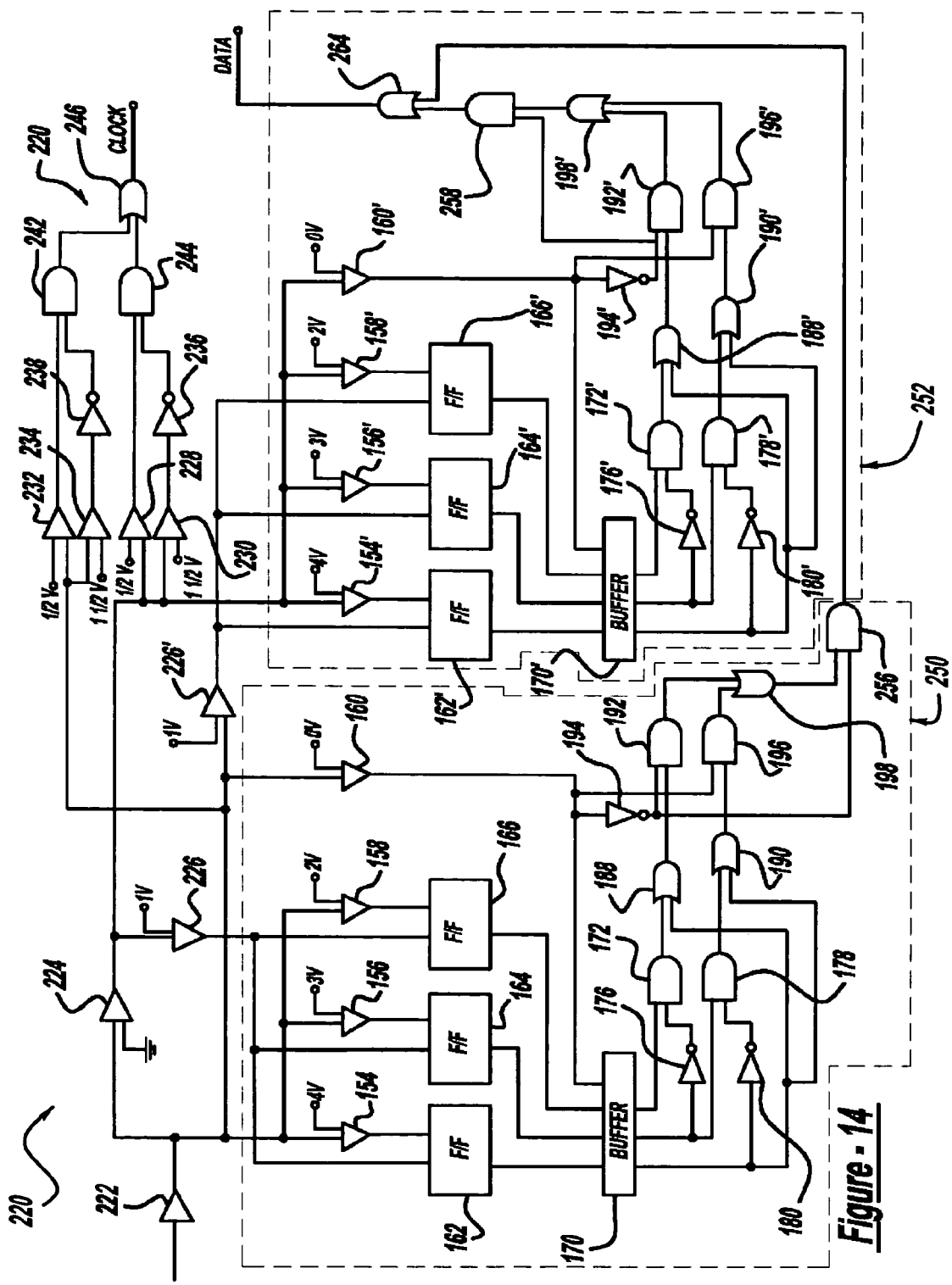
FIG. 14 is a schematic diagram of a demodulator circuit in a receiver, according to the invention, where the demodulator circuit extracts the clock and data signals modulated onto the carrier wave in FIG. 12.

FIG. 14 is a schematic diagram of a receiver circuit 220, according to another embodiment of the present invention, that extracts the clock and data signals modulated onto the sine wave transmitted by the modulator circuit 210 in FIG.

12. In this example, the receiver circuit 220 extracts two bits per every half-cycle of the sine wave.

In this embodiment, the received sine wave is quadrupled in frequency to recreate the original clock signal. The received sine wave is amplified by an AGC amplifier 222. The amplified signal from the amplifier 222 is applied to an inverting amplifier 224, and the inverted sine wave is applied to an operational amplifier 226 in the same manner as discussed above for the circuit 140. Additionally, the inverted sine wave is applied to operational amplifiers 228 and 230, where the other input of the amplifier 228 is 0.5 volts and the other input of the amplifier 230 is 1.5 volts. Likewise, the uninverted sine wave is applied to operational amplifiers 232 and 234, where the other input of the amplifier 232 is 0.5 volts and the other input of the amplifier 234 is 1.5 volts. The output of the amplifier 230 is inverted by an inverter 236 and the output of the amplifier 234 is inverted by an inverter 238. The output of the amplifier 232 and the inverter 238 are applied to an AND gate 242, and the output of the amplifier 228 and the inverter 236 are applied to an AND gate 244. The outputs of the AND gates 242 and 244 are applied to an OR gate 246, whose output is the clock signal in the circuit 220. Based on this design, the various amplifiers, inverters and logic gates provide an output pulse for each quarter of the original sine wave for both the positive and negative portions of the cycle, providing the quadrupled clock speed of the original clock signal from the received sine wave.

The modulated sine wave from the amplifier 222 and the output of the amplifier 226 are applied to an extraction circuit 250 that includes the data extraction part of the circuit 140, discussed above, where like reference numerals are labeled the same. Because the operation of the extraction circuit 250 is discussed above, a detailed discussion of this portion of the circuit 220 will not be given. It should be noted that the extraction circuit 250 extracts the data on the positive portion of the modulated sine wave from the amplifier 222, or two bits.

An extraction circuit 252 is provided for extracting the bits on the negative portion of the modulated sine wave, and includes the same elements as the extraction circuit 250, but identified with a prime. Therefore, the extraction circuit 252 will also not be discussed in detail.

The circuit 220 includes an AND gate 256 in the extraction circuit 250 that receives an input from the OR gate 198 and an input from the inverter 194. Thus, the output of the AND gate 256 is only high when the sine wave is on the positive portion of the cycle and includes a one bit. Likewise, the circuit 220 includes an AND gate 258 in the extraction circuit 252 that receives an input from the OR gate 198 and the inverter 194. Thus, the AND gate 258 is only high when the sine wave is on the negative portion of the cycle and includes a one bit. The outputs of the AND gates 256 and 258 are applied to an OR gate 264 that provides a high output for each one bit that is transmitted on both the positive and negative portions of the sine wave.

The discussion above describes various transmitter circuits that synchronize clock and data signals onto a common carrier wave, and various receiver circuits that extract the clock and data signals from the carrier wave. These circuits allow more bits to be transmitted per cycle of the carrier wave than was heretofore known in the art. Additionally, because the clock and data signals are synchronized, carrier wave bandwidth can be better utilized in that more carrier wave frequencies can be used for other data channels. Also, variations in the carrier wave frequency from crystal limitations do not affect the data on the resulting carrier wave.

It is stressed that the specific components and voltage values used in the circuits discussed herein do not limit the invention. Other circuit components and values, including calculations made in software, can also be used.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A transmitter circuit for transmitting a digital data signal, said transmitter circuit comprising:
    a divider system responsive to a square-wave clock signal and dividing the clock signal;
    a square wave-to-sine wave converter responsive to the divided clock signal, said converter converting the square wave clock signal to a sine wave carrier signal;
    a logic system responsive to the divided clock signal and the digital data signal, said logic system providing a gain signal having at least three levels of amplitude; and
    an output amplifier responsive to the sine wave carrier signal and the gain signal, said output amplifier modulating the carrier signal with the gain signal so as to provide at least three levels of pain so that more than one bit in the data signal is transmitted for every cycle of the carrier signal.

2. The circuit according to claim 1 wherein the divider system is a single divide-by-two divider, and wherein the number of bits transmitted for every cycle of the carrier signal is one bit for every half cycle of the carrier signal.

3. The circuit according to claim 1 wherein the divider system is a first divide-by-two divider and a second divide-by-two divider, and wherein the number of bits transmitted for every cycle of the carrier signal is two bits for every half-cycle of the carrier signal.

4. A transmitter circuit for transmitting a digital signal, said transmitter circuit comprising:
    a divider system responsive to a square-wave clock signal and dividing the clock signal;
    a first inverter responsive to and inverting the clock signal;
    a square wave-to-sine wave converter responsive to the divided clock signal from the divider system, said converter converting the square wave signal to a sine wave signal;
    a logic system responsive to the divided clock signal from the divider system and the inverted clock signal from the first inverter, said logic system generating a gain signal having at least three levels of amplitude; and
    an output amplifier responsive to the sine wave signal and the gain signal, said output amplifier outputting a carrier signal modulated with the gain signal to provide at least three levels of gain so that multiple data bits in the digital signal are provided for each cycle of the carrier signal.

5. The circuit according to claim 4 wherein the gain signal is one of a zero gain signal level, a first gain signal level, a second gain signal level or a third gain signal level so as to provide the multiple bits per cycle of the carrier signal.

6. The circuit according to claim 4 wherein the modulated carrier signal includes multiple bits on the combination of the positive portion and the negative portion of each clock cycle of the carrier signal.

7. The circuit according to claim 4 wherein the circuit generates two data bits for every cycle of the carrier signal.

8. The circuit according to claim 4 wherein the circuit generates four data bits for every cycle of the carrier wave signal.

9. The circuit according to claim 4 wherein the divider system includes one divide-by-two divider for dividing the clock signal by two.

10. The circuit according to claim 4 wherein the divider system includes two divide-by-two dividers for dividing the clock signal by four.

11. The circuit according to claim 4 wherein the logic system includes a first logic gate responsive to the inverted clock signal and the divided clock signal, said first logical gate outputting a high signal when the inverted clock signal and the divided signal are high, a first flip-flop device responsive to the output of the first logic gate and the data signal, said first flip-flop device transferring the data signal to an output of the first flip-flop device when the output of the first logic gate is high, a second logic gate responsive to the inverted clock signal and a divided and inverted clock signal, said second logic gate outputting a high signal when the inverted clock signal and the inverted and divided clock signal are both high, a second flip-flop device responsive to the data signal and the output of the second logic gate, said second flip-flop device transferring the data signal to an output of the second flip-flop device when the output of the second logic gate is high, a buffer responsive to the output of the first flip-flop device, the output of the second flip-flop device and an inverted output of the first logic gate, said buffer simultaneously outputting the output of the first flip-flop device and the second flip-flop device each time the inverted output of the first logic gate is high, and a first summing amplifier network including a first summing amplifier and a voltage divider network coupled to a first input of the summing amplifier, said voltage divider network being responsive to both outputs of the buffer, wherein an output of the first summing amplifier is the gain signal.

12. The circuit according to claim 11 wherein the first and second logic gates are AND gates.

13. The circuit according to claim 11 wherein the voltage divider network includes a first variable resistor and a second variable resistor, wherein the first variable resistor is coupled to one output of the buffer and the second variable resistor is coupled to the other output of the buffer.

14. The circuit according to claim 11 further comprising a second summing amplifier, said second summing amplifier being responsive to the output of the first summing amplifier and inverting the output of the first summing amplifier.

15. A method for transmitting a digital data signal, said method comprising:
   dividing a square-wave clock signal by a divider system;
   converting the divided square-wave clock signal to a divided sine wave signal;
   applying the clock signal and the digital data signal to a logic system to provide a pain signal having at least three levels of amplitude;
   applying the divided sine wave signal to an output amplifier; and
   applying the gain signal to the output amplifier for modulating the sine wave signal with the data signal to generate a carrier signal having at least three levels of amplitude to provide more than one digital bit for every cycle of the carrier signal.

16. The method according to claim 15 wherein dividing the clock signal by a divider system includes dividing the clock signal by a divider system that includes a single divide-by-two divider so that the number of bits transmitted for every cycle of the carrier signal is one bit for every half-cycle of the carrier signal.

17. The method according to claim 15 wherein dividing the clock signal by a divider system includes dividing the clock signal by a divider system that includes a first divide-by-two divider and a second divide-by-two divider so that the number of bits transmitted for every cycle of the carrier signal is two bits for every half-cycle of the carrier signal.

18. The method according to claim 15 wherein the gain signal is a zero level gain signal, a first level gain signal, a second level gain signal or a third level gain signal.

* * * * *